(12) United States Patent
Matsen et al.

(10) Patent No.: US 10,968,497 B2
(45) Date of Patent: Apr. 6, 2021

(54) TOOL FOR HEATING AND QUENCHING A STRUCTURE

(71) Applicant: The Boeing Company, Chicago, IL (US)

(72) Inventors: Marc R. Matsen, Seattle, WA (US); Lee Charles Firth, Renton, WA (US); Luis Leon, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 579 days.

(21) Appl. No.: 15/842,723

(22) Filed: Dec. 14, 2017

(65) Prior Publication Data
US 2019/0185949 A1    Jun. 20, 2019

(51) Int. Cl.
| | |
|---|---|
| *C21D 1/42* | (2006.01) |
| *C21D 1/673* | (2006.01) |
| *C22F 1/00* | (2006.01) |
| *C22F 1/04* | (2006.01) |

(52) U.S. Cl.
CPC .............. *C21D 1/673* (2013.01); *C21D 1/42* (2013.01); *C22F 1/002* (2013.01); *C22F 1/04* (2013.01)

(58) Field of Classification Search
CPC . C21D 1/673; C21D 1/42; C22F 1/002; C22F 1/004
See application file for complete search history.

(56) References Cited

U.S. PATENT DOCUMENTS

| | | | |
|---|---|---|---|
| 8,017,059 B2 | 9/2011 | Matsen et al. | |
| 8,343,402 B1* | 1/2013 | Matsen ................. | C22C 1/0491 264/125 |
| 8,480,823 B1* | 7/2013 | Matsen ................... | B29C 70/46 148/574 |
| 8,556,619 B2 | 10/2013 | Matsen et al. | |
| 2014/0219854 A1* | 8/2014 | Matsen ..................... | B22F 3/16 419/29 |

* cited by examiner

*Primary Examiner* — Scott R Kastler
(74) *Attorney, Agent, or Firm* — Yee & Associates, P.C.

(57) ABSTRACT

A structure is heated in a tool. The structure is quenched in the tool such that a shape of the structure is maintained, in which quenching is performed by contacting the structure with a quenching medium.

38 Claims, 12 Drawing Sheets

TOOL FOR HEATING AND QUENCHING A STRUCTURE

BACKGROUND INFORMATION

1. Field

The present disclosure relates generally to heat treating structures and, more specifically, to heating and quenching structures in the same tool.

2. Background

Structures are heat treated to achieve desired material characteristics. After heating a structure, the structure is subjected to a controlled cooling.

One type of controlled cooling is quenching. Quenching is a rapid cooling of the structure. Maintaining dimensional tolerances following heat treatment is difficult due to warping during quenching.

In some processes, to create a structure having a desired shape, heat treatment is avoided after forming the desired shape. If heat treatment is not performed, the structure may not have the desired material characteristics.

In some processes, a structure having excess material is heated and quenched. After quenching, the excess material is removed to form a desired shape for the structure. The material removal adds at least one of manufacturing time, manufacturing waste, or cost to the structure.

Therefore, it would be desirable to have a method and apparatus that take into account at least some of the issues discussed above, as well as other possible issues. For example, it would be desirable to have a method and apparatus to perform quenching without warping. As another example, it would be desirable to reduce at least one of manufacturing time or material waste produced to form a part having desired final dimensions after heating and quenching.

SUMMARY

An illustrative embodiment of the present disclosure provides a method. A structure is heated in a tool. The structure is quenched in the tool such that a shape of the structure is maintained, in which quenching is performed by contacting the structure with a quenching medium.

Another illustrative embodiment of the present disclosure provides a tooling die. The tooling die comprises a plurality of dielectric laminates, a ceramic facing, a contoured smart susceptor, and induction coils. The plurality of dielectric laminates has air gaps defined between adjacent dielectric laminates. The ceramic facing is connected to at least some of the plurality of dielectric laminates. The contoured smart susceptor contacts the ceramic facing. The contoured smart susceptor has a curve in a first cross-sectional direction. The induction coils are disposed in some of the air gaps formed between adjacent dielectric laminates, wherein each induction coil of the induction coils extends through a single air gap.

A further illustrative embodiment of the present disclosure provides an induction tool. The induction tool comprises a first tooling die and a second tooling die movable relative to each other, each of the first tooling die and the second tooling die having a respective contoured smart susceptor having apertures.

A yet further illustrative embodiment of the present disclosure provides a method. A plurality of dielectric laminates is positioned such that air gaps are defined between adjacent laminates. A ceramic facing is connected to at least some of the plurality of dielectric laminates. Induction coils are disposed in some of the air gaps formed between adjacent dielectric laminates, wherein each induction coil of the induction coils extends through a single air gap. A contoured smart susceptor is placed in contact with the ceramic facing to form a first tooling die, the contoured smart susceptor having a curve in a first cross-sectional direction.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that aluminum lip skins for aircraft have complex curvatures. The illustrative embodiments recognize and take into account that aluminum lip skins for aircraft desirably undergo heat treatment to produce desired material characteristics. For example, the illustrative embodiments recognize and take into account that, for aircraft components, it is desirable to establish a solution treated condition in an aluminum aircraft component. The illustrative embodiments recognize and take into account that the aluminum alloy component would be heated to the solution treatment temperature and then cooled rapidly. The illustrative embodiments recognize and take into account that it is desirable for a quench speed to be sufficient to produce the needed W condition. The illustrative embodiments recognize and take into account that in some instances, a quenched component will be aged to provide desired mechanical attributes. The illustrative embodiments recognize and take into account that maintaining dimensional tolerances of the aluminum lip skins during heat treatment is undesirably difficult due to warping during quenching.

The illustrative embodiments recognize and take into account that it is desirable to maintain dimensional control of a structure after heating and quenching the structure. For example, the illustrative embodiments recognize and take into account that it is desirable for an aluminum lip skin type structure to be solution treated and quenched with dimensional control of the structure.

The illustrative embodiments recognize and take into account that it is desirable to have as little forming and shaping work as possible for a part after heat treatment. The illustrative embodiments recognize and take into account that it is desirable to heat and quench a part having dimensions as close as possible to the desired final dimensions. The illustrative embodiments recognize and take into account that heating and quenching parts having dimensions as close as possible to final dimensions desirably reduces manufacturing time after heating and quenching.

Figure 1:
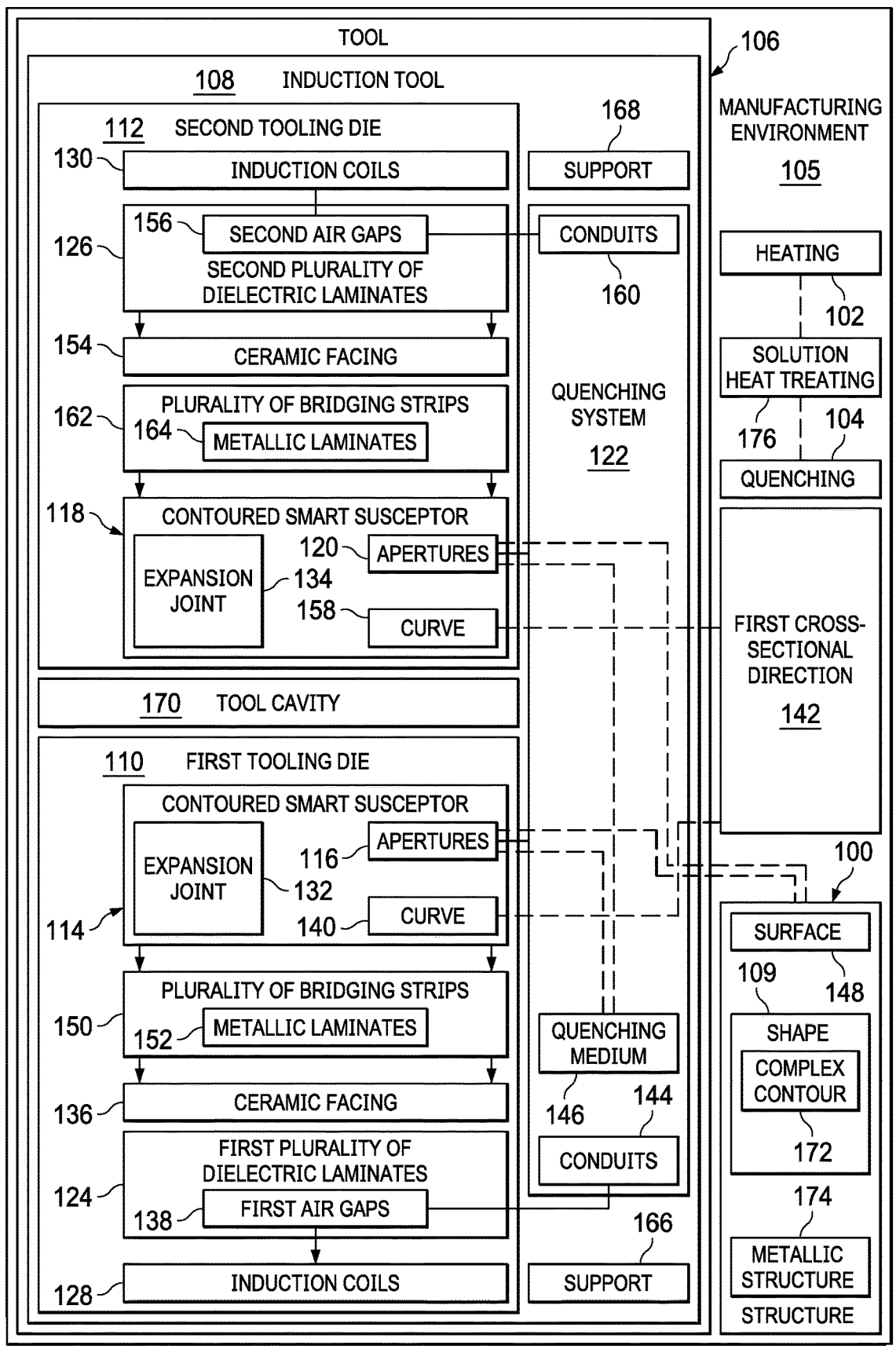
FIG. 1 is an illustration of a block diagram of a manufacturing environment in which a structure is heated and quenched in a tool in accordance with an illustrative embodiment.

Referring now to the figures and, in particular, with reference to FIG. 1, an illustration of a block diagram of a manufacturing environment in which a structure is heated and quenched in a tool is depicted in accordance with an illustrative embodiment. Structure 100 receives heating 102 and quenching 104 in manufacturing environment 105. Tool 106 performs heating 102 and quenching 104 on structure 100. Quenching 104 structure 100 in induction tool 108 is performed such that shape 109 of the structure 100 is maintained.

As depicted, tool 106 is induction tool 108. Induction tool 108 comprises first tooling die 110 and second tooling die 112 movable relative to each other. Each of first tooling die 110 and second tooling die 112 have a respective contoured smart susceptor having apertures. As used herein, a smart susceptor is constructed of a material, or materials, that generate heat efficiently until reaching a threshold (i.e., Curie) temperature. First tooling die 110 has contoured smart susceptor 114 with apertures 116. Second tooling die 112 has contoured smart susceptor 118 with apertures 120.

Induction tool 108 further comprises quenching system 122 in communication with the apertures of each respective contoured smart susceptor. Quenching system 122 is in communication with apertures 116 of contoured smart susceptor 114. Quenching system 122 is in communication with apertures 120 of contoured smart susceptor 118.

Induction tool 108 further comprises induction coils disposed between first plurality of dielectric laminates 124 of first tooling die 110 and second plurality of dielectric laminates 126 of second tooling die 112. Induction coils 128 are disposed between first plurality of dielectric laminates 124. Induction coils 130 are disposed between second plurality of dielectric laminates 126.

In some illustrative examples, each respective contoured smart susceptor has an expansion joint. As depicted, contoured smart susceptor 114 has expansion joint 132. As depicted, contoured smart susceptor 118 has expansion joint 134.

Expansion joint 132 allows for contoured smart susceptor 114 to expand during heat-up. Expansion joint 132 absorbs thermal expansion of contoured smart susceptor 114. In some illustrative examples, expansion joint 132 is a circumferential discontinuity in contoured smart susceptor 114.

Expansion joint 134 allows for contoured smart susceptor 118 to expand during heat-up. Expansion joint 134 absorbs thermal expansion of contoured smart susceptor 118. In some illustrative examples, expansion joint 134 is a circumferential discontinuity in contoured smart susceptor 118.

Although only one expansion joint is depicted in each of contoured smart susceptor 114 and contoured smart susceptor 118, any desirable quantity of expansion joints may be present. In some illustrative examples, contoured smart susceptor 114 and contoured smart susceptor 118 each have two or more expansion joints.

First tooling die 110 comprises first plurality of dielectric laminates 124, ceramic facing 136, contoured smart susceptor 114, and induction coils 128. First plurality of dielectric laminates 124 have first air gaps 138 defined between adjacent dielectric laminates. Ceramic facing 136 is connected to at least some of first plurality of dielectric laminates 124. Contoured smart susceptor 114 contacts ceramic facing 136. Ceramic facing 136 is formed from one or more ceramic portions. Ceramic facing 136 may have any desirable design configured to protect first plurality of dielectric laminates 124 from convective or conductive heat. Ceramic facing 136 may have any desirable design configured to allow flow of quenching medium 146 to apertures 116.

In some illustrative examples, ceramic facing 136 is a single ceramic portion. In other illustrative examples, ceramic facing 136 has the same quantity of ceramic portions as a quantity of dielectric laminates in first plurality of dielectric laminates 124. In these illustrative examples, each ceramic portion of ceramic facing 136 would be associated with a dielectric laminate of first plurality of dielectric laminates 124. In some illustrative examples, ceramic facing 136 has a quantity of ceramic portions less than a quantity of dielectric laminates in first plurality of dielectric laminates 124, such that some ceramic portions are connected to more than one dielectric laminates in first plurality of dielectric laminates 124.

Contoured smart susceptor 114 has curve 140 in first cross-sectional direction 142. Induction coils 128 are disposed in some of first air gaps 138 formed between adjacent dielectric laminates. Each induction coil of induction coils 128 extends through a single air gap. In some illustrative examples, each of first air gaps 138 has a respective induction coil of induction coils 128. In other illustrative examples, at least one air gap of first air gaps 138 does not have an induction coil. In some illustrative examples, induction coils 128 run substantially parallel to curve 140 of contoured smart susceptor 114 in first cross-sectional direction 142.

In some illustrative examples, conduits 144 of quenching system 122 are disposed in some of first air gaps 138. In some illustrative examples, quenching system 122 has conduits 144 extending along induction coils 128.

Conduits 144 deliver quenching medium 146 to contoured smart susceptor 114. Conduits 144 deliver quenching medium 146 to apertures 116. In some illustrative examples, quenching 104 comprises cooling of structure 100 using contoured smart susceptor 114. In some illustrative examples, quenching 104 comprises cooling of structure 100 by quenching medium 146 exiting apertures 116.

In some illustrative examples, contoured smart susceptor 114 includes apertures 116 to allow quenching medium 146 from quenching system 122 to quench surface 148 of structure 100 in contact with contoured smart susceptor 114.

First plurality of dielectric laminates 124 is laid out in any desirable layout. In some illustrative examples, each of first plurality of dielectric laminates 124 run substantially parallel to each other. In some illustrative examples, each of first plurality of dielectric laminates 124 are arranged in a fan shape relative to a centerline of first tooling die 110.

First tooling die 110 also comprises plurality of bridging strips 150 within ceramic facing 136. Plurality of bridging strips 150 provides support to contoured smart susceptor 114. Plurality of bridging strips 150 contacts contoured smart susceptor 114. In some illustrative examples, plurality of bridging strips 150 is formed of metallic laminates 152.

In some illustrative examples, plurality of bridging strips 150 run substantially perpendicular to first plurality of dielectric laminates 124. Each of plurality of bridging strips 150 extend over multiple air gaps of first air gaps 138.

In some illustrative examples, plurality of bridging strips 150 is parallel to each other. In some illustrative examples, plurality of bridging strips 150 is positioned between induction coils 128 and contoured smart susceptor 114.

Plurality of bridging strips 150 does not contact first plurality of dielectric laminates 124. Ceramic facing 136 is positioned between first plurality of dielectric laminates 124 and plurality of bridging strips 150. Ceramic facing 136 protects first plurality of dielectric laminates 124 from conductive heating. First plurality of dielectric laminates 124 is formed of a material that is not inductively heated by induction coils 128.

Second tooling die 112 comprises second plurality of dielectric laminates 126, ceramic facing 154, contoured smart susceptor 118, and induction coils 130. Second plurality of dielectric laminates 126 have second air gaps 156 defined between adjacent dielectric laminates. Ceramic facing 154 is connected to at least some of second plurality of dielectric laminates 126. Contoured smart susceptor 118 contacts ceramic facing 154. Ceramic facing 154 is formed from one or more ceramic portions. Ceramic facing 154 may have any desirable design configured to protect second plurality of dielectric laminates 126 from convective or conductive heat. Ceramic facing 154 may have any desirable design configured to allow flow of quenching medium 146 to apertures 120.

In some illustrative examples, ceramic facing 154 is a single ceramic portion. In other illustrative examples, ceramic facing 154 has the same quantity of ceramic portions as a quantity of dielectric laminates in second plurality of dielectric laminates 126. In these illustrative examples, each ceramic portion of ceramic facing 154 would be associated with a dielectric laminate of second plurality of dielectric laminates 126. In some illustrative examples, ceramic facing 154 has a quantity of ceramic portions less than a quantity of dielectric laminates in second plurality of dielectric laminates 126, such that some ceramic portions are connected to more than one dielectric laminates in second plurality of dielectric laminates 126.

Contoured smart susceptor 118 has curve 158 in first cross-sectional direction 142. Induction coils 130 are disposed in some of second air gaps 156 formed between adjacent dielectric laminates. Each induction coil of induction coils 130 extends through a single air gap. In some illustrative examples, each of second air gaps 156 has a respective induction coil of induction coils 130. In other illustrative examples, at least one air gap of second air gaps 156 does not have an induction coil. In some illustrative examples, induction coils 130 run substantially parallel to curve 158 of contoured smart susceptor 118 in first cross-sectional direction 142.

In some illustrative examples, conduits 160 of quenching system 122 are disposed in some of second air gaps 156. In some illustrative examples, quenching system 122 has conduits 160 extending along induction coils 130.

Conduits 160 deliver quenching medium 146 to contoured smart susceptor 118. Conduits 160 deliver quenching medium 146 to apertures 120. In some illustrative examples, quenching 104 comprises cooling of structure 100 using contoured smart susceptor 118. In some illustrative examples, quenching 104 comprises cooling of structure 100 by quenching medium 146 exiting apertures 120.

In some illustrative examples, contoured smart susceptor 118 includes apertures 120 to allow quenching medium 146 from quenching system 122 to quench surface 148 of structure 100 in contact with contoured smart susceptor 118.

Second plurality of dielectric laminates 126 is laid out in any desirable layout. In some illustrative examples, each of second plurality of dielectric laminates 126 run substantially parallel to each other. In some illustrative examples, each of second plurality of dielectric laminates 126 are arranged in a fan shape relative to a centerline of second tooling die 112.

Second tooling die 112 also comprises plurality of bridging strips 162 within ceramic facing 154. Plurality of bridging strips 162 provides support to contoured smart susceptor 118. Plurality of bridging strips 162 contacts contoured smart susceptor 118. In some illustrative examples, plurality of bridging strips 162 is formed of metallic laminates 164.

In some illustrative examples, plurality of bridging strips 162 run substantially perpendicular to second plurality of dielectric laminates 126. Each of plurality of bridging strips 162 extend over multiple air gaps of second air gaps 156.

In some illustrative examples, plurality of bridging strips 162 is parallel to each other. In some illustrative examples, plurality of bridging strips 162 is positioned between induction coils 130 and contoured smart susceptor 118.

Plurality of bridging strips 162 does not contact second plurality of dielectric laminates 126. Ceramic facing 154 is positioned between second plurality of dielectric laminates 126 and plurality of bridging strips 162. Ceramic facing 154 protects second plurality of dielectric laminates 126 from conductive heating. Second plurality of dielectric laminates 126 is formed of a material that is not inductively heated by induction coils 130.

First tooling die 110 is connected to support 166. Support 166 provides a foundation for first plurality of dielectric laminates 124. Second tooling die 112 is connected to support 168. Support 168 provides a foundation for second plurality of dielectric laminates 126.

First tooling die 110 and second tooling die 112 close together to form tool cavity 170. Tool cavity 170 contains structure 100 for heating 102 and quenching 104. First tooling die 110 and second tooling die 112 restrain structure 100 within tool cavity 170. Complex contour 172 of structure 100 is the same as a shape of tool cavity 170. Shape 109 of structure 100 includes complex contour 172.

In some illustrative examples, structure 100 is metallic structure 174. In some illustrative examples, when structure 100 is metallic structure 174, heating 102 and quenching 104 structure 100 in tool 106 comprises solution heat treating 176 metallic structure 174. To perform heating 102, induction coils 128 and induction coils 130 initiate inductive heating of contoured smart susceptor 114 and contoured smart susceptor 118.

The illustration of manufacturing environment 105 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 2:
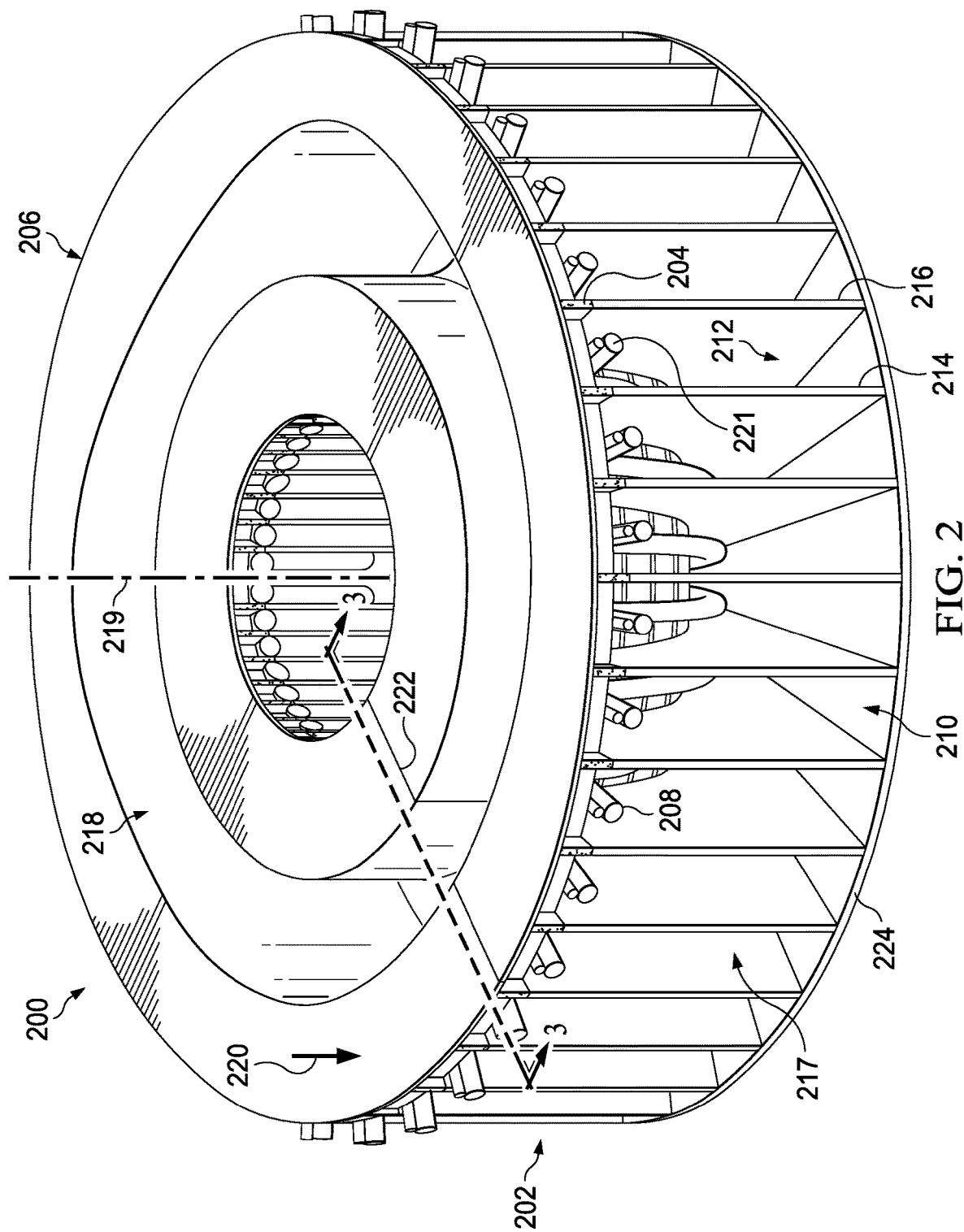
FIG. 2 is an illustration of an isometric view of a tooling die in accordance with an illustrative embodiment.

Turning now to FIG. 2, an illustration of an isometric view of a tooling die is depicted in accordance with an illustrative embodiment. Tooling die 200 is a physical implementation of one of first tooling die 110 or second tooling die 112 of FIG. 1.

Tooling die 200 comprises plurality of dielectric laminates 202, ceramic facing 204, contoured smart susceptor 206, and induction coils 208. Plurality of dielectric laminates 202 have air gaps 210 defined between adjacent dielectric laminates. For example, air gap 212 is defined between adjacent dielectric laminates, dielectric laminate 214 and dielectric laminate 216. As depicted, each of plurality of dielectric laminates 202 is arranged in fan shape 217 relative to centerline 219 of tooling die 200.

Ceramic facing 204 is connected to at least some of plurality of dielectric laminates 202. Contoured smart susceptor 206 contacts ceramic facing 204. Contoured smart susceptor 206 has curve 218 in first cross-sectional direction 220.

Induction coils 208 are disposed in some of air gaps 210 formed between adjacent dielectric laminates. For example, induction coil 221 is disposed in air gap 212 between adjacent dielectric laminates, dielectric laminate 214 and dielectric laminate 216. Each induction coil of induction coils 208 extends through a single air gap. For example, induction coil 221 extends through only air gap 212.

As depicted, each of air gaps 210 has a respective induction coil of induction coils 208. As depicted, only one induction coil of induction coils 208 is positioned in each air gap of air gaps 210. In some non-depicted examples, some air gaps of air gaps 210 do not have induction coils. In some non-depicted examples, at least one air gap of air gaps 210 has more than one induction coil of induction coils 208.

As depicted, contoured smart susceptor 206 has expansion joint 222. Expansion joint 222 allows for contoured smart susceptor 206 to expand during heat-up. Expansion joint 222 absorbs thermal expansion of contoured smart susceptor 206. As depicted, expansion joint 222 is a circumferential discontinuity in contoured smart susceptor 206.

As depicted, tooling die 200 also includes support 224. In some illustrative examples, support 224 may also be referred to as a base. Support 224 is formed of any desirable material. In some illustrative examples, support 224 is formed of a composite material. Support 224 of tooling die 200 provides a foundation for plurality of dielectric laminates 202.

Figure 3:
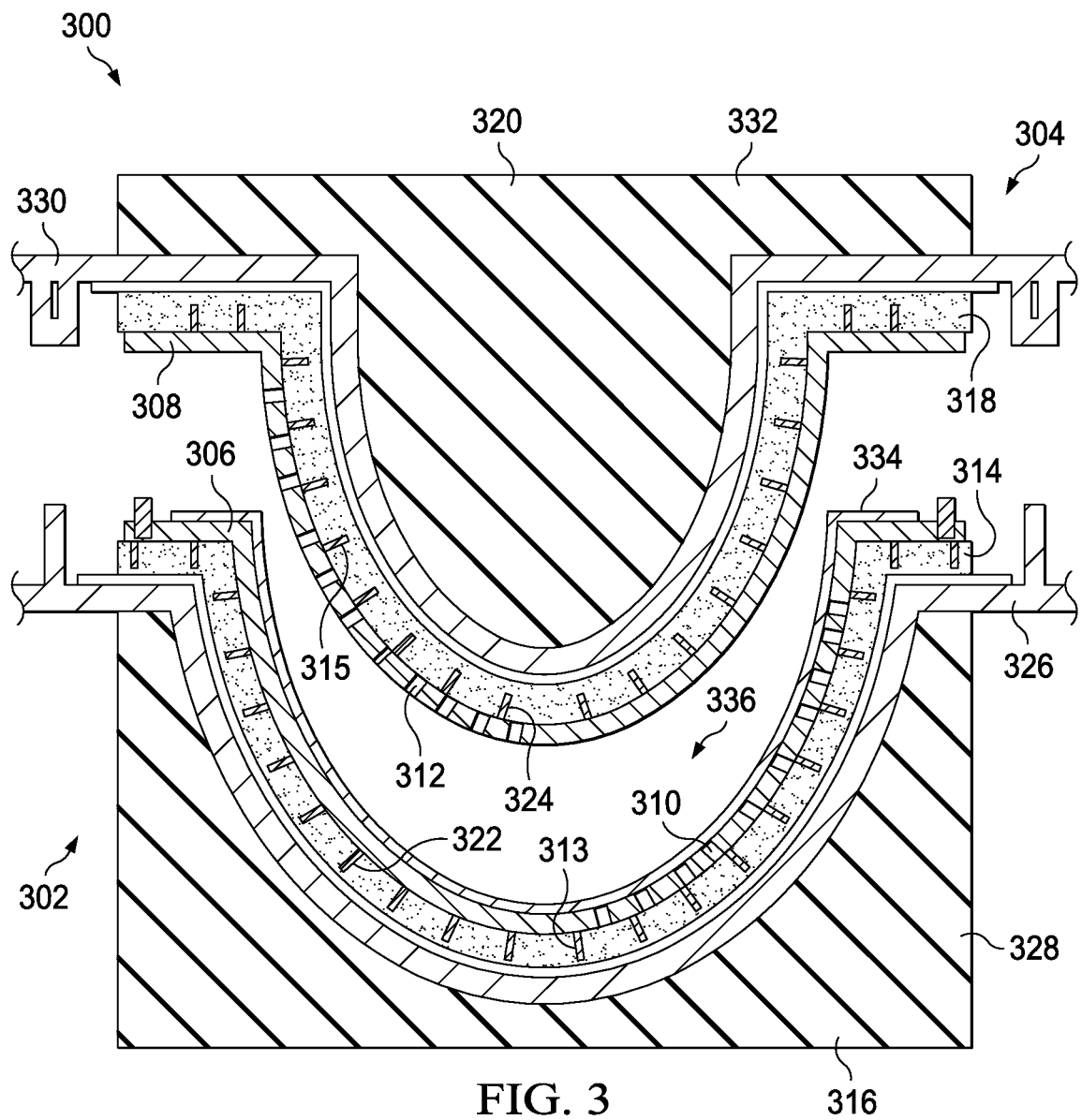
FIG. 3 is an illustration of a cross-sectional view of an induction tool and a structure in accordance with an illustrative embodiment.

Turning now to FIG. 3, an illustration of a cross-sectional view of an induction tool and a structure is depicted in accordance with an illustrative embodiment. Induction tool 300 is a physical implementation of induction tool 108 of FIG. 1. Induction tool 300 has first tooling die 302 and second tooling die 304 movable relative to each other. In some illustrative examples, second tooling die 304 is an implementation of tooling die 200 of FIG. 2.

Each of first tooling die 302 and second tooling die 304 has a respective contoured smart susceptor having apertures. First tooling die 302 has contoured smart susceptor 306. Second tooling die 304 has contoured smart susceptor 308. Contoured smart susceptor 306 has apertures 310. Contoured smart susceptor 308 has apertures 312.

As depicted, ceramic facing 314 is positioned between dielectric laminate 316 of first tooling die 302 and contoured smart susceptor 306. Ceramic facing 314 protects dielectric laminate 316 from heat generated by contoured smart susceptor 306. As depicted, ceramic facing 318 is positioned between dielectric laminate 320 of second tooling die 304 and contoured smart susceptor 308. Ceramic facing 318 protects dielectric laminate 320 from heat generated by contoured smart susceptor 308.

A plurality of bridging strips 313 is positioned within ceramic facing 314. A plurality of bridging strips 315 is positioned within ceramic facing 318. In some illustrative examples, the plurality of bridging strips 315 is formed of metallic laminates.

Metallic laminates reinforce each of ceramic facing 314 and ceramic facing 318. Metallic laminates 322 reinforce ceramic facing 314. Metallic laminates 324 reinforce ceramic facing 318.

Metallic laminates 322 and ceramic facing 314 contact contoured smart susceptor 306. Metallic laminates 324 and ceramic facing 318 contact contoured smart susceptor 308.

In this cross-sectional view, plurality of bridging strips 313 in the form of metallic laminates 322 run substantially perpendicular to dielectric laminate 316. As depicted, plurality of bridging strips 313 in the form of metallic laminates 322 run into and out of the page in FIG. 3 while dielectric laminate 316 runs in plane with the page. In this cross-sectional view, the plurality of bridging strips 315 in the form of metallic laminates 324, run substantially perpendicular to dielectric laminate 320. As depicted, plurality of bridging strips 315 in the form of metallic laminates 324 run into and out of the page in FIG. 3 while dielectric laminate 320 runs in plane with the page.

Induction coil 326 is disposed within air gap 328. In this cross-sectional view, the plurality of bridging strips 313 in the form of metallic laminates 322, is positioned between induction coil 326 and contoured smart susceptor 306. Induction coil 330 is disposed within air gap 332. In this cross-sectional view, the plurality of bridging strips 315 in the form of metallic laminates 324, is positioned between induction coil 330 and contoured smart susceptor 308.

As depicted, structure 334 is positioned on contoured smart susceptor 306 of first tooling die 302. Structure 334 is a physical implementation of structure 100 of FIG. 1. Structure 334 has shape 336. Structure 334 will be heated and quenched in induction tool 300. To close induction tool 300, at least one of first tooling die 302 and second tooling die 304 is moved towards the other tooling die.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Figure 4:
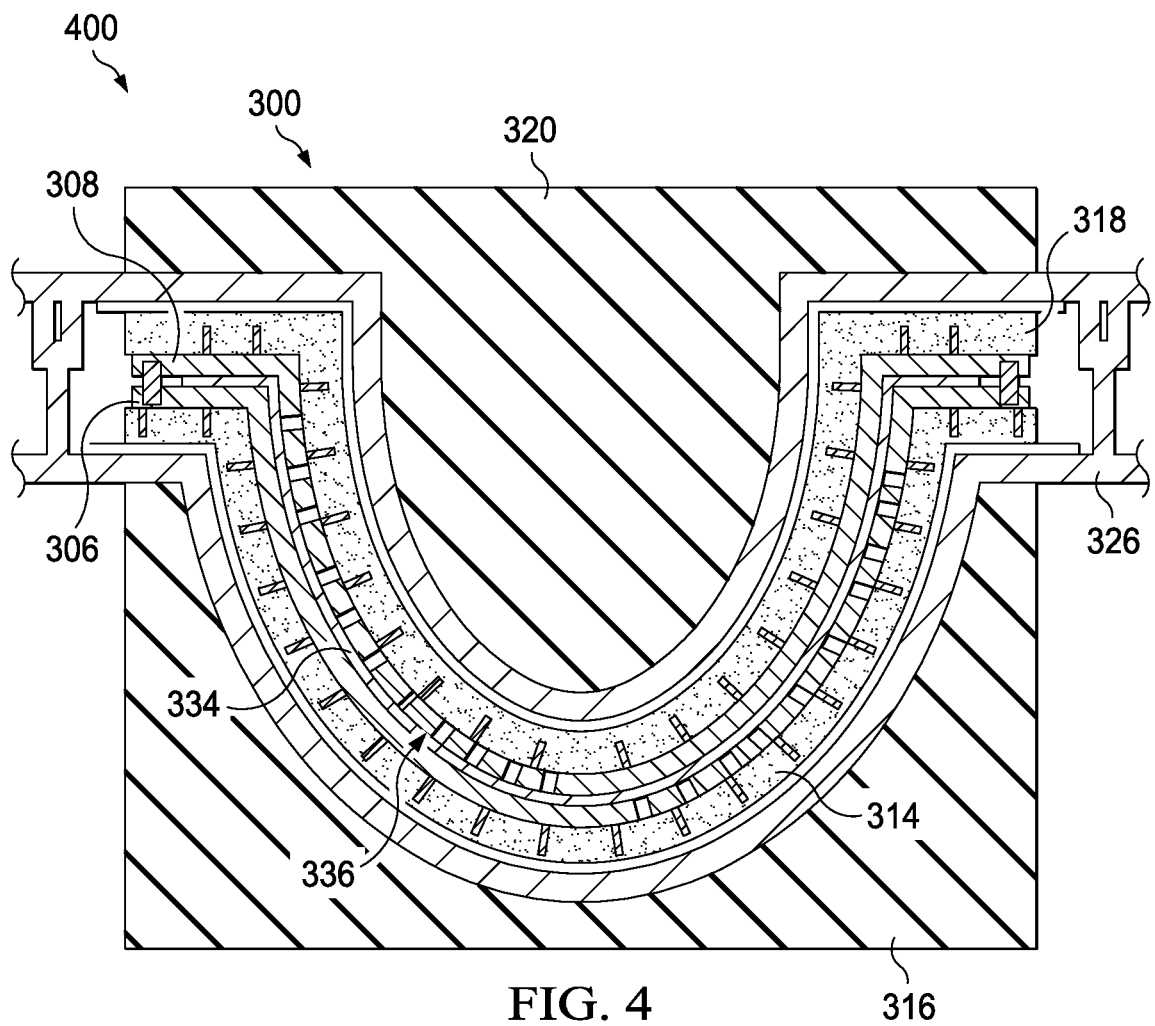
FIG. 4 is an illustration of a cross-sectional view of an induction tool and a structure during heating in accordance with an illustrative embodiment.

Turning now to FIG. 4, an illustration of a cross-sectional view of an induction tool and a structure during heating is depicted in accordance with an illustrative embodiment. View 400 is a view of induction tool 300 and structure 334 after closing induction tool 300. As depicted, structure 334 contacts contoured smart susceptor 306 and contoured smart susceptor 308. Contoured smart susceptor 306 and contoured smart susceptor 308 hold structure 334 in place during heating and quenching. By holding structure 334 in place during heating and quenching, structure 334 retains shape 336.

In some illustrative examples, view 400 is a view prior to heating of structure 334. In some illustrative examples, view 400 is a view during heating of structure 334.

During heating of structure 334, induction coil 326 excites contoured smart susceptor 306 to heat contoured smart susceptor 306. During heating of structure 334, induction coil 330 excites contoured smart susceptor 306 to heat contoured smart susceptor 308.

Ceramic facing 314 shields dielectric laminate 316 from convective heating from contoured smart susceptor 306. The material of dielectric laminate 316 is selected to not inductively heat when exposed to a magnetic field from induction coil 326. Ceramic facing 318 shields dielectric laminate 320 from convective and conductive heating from contoured smart susceptor 308. The material of dielectric laminate 320 is selected to not inductively heat when exposed to a magnetic field from induction coil 330.

Figure 5:
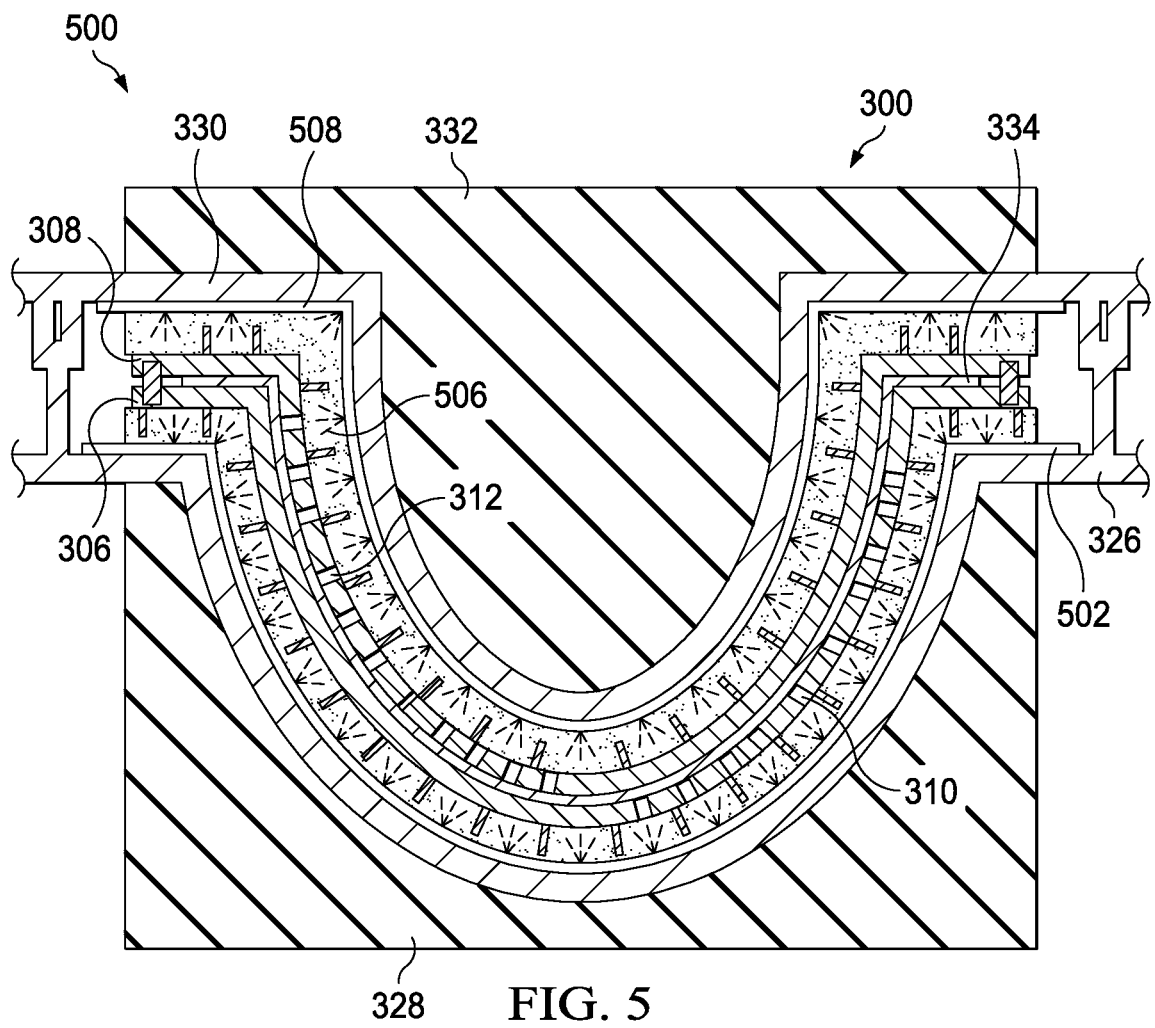
FIG. 5 is an illustration of a cross-sectional view of an induction tool and a structure during quench in accordance with an illustrative embodiment.

Turning now to FIG. 5, an illustration of a cross-sectional view of an induction tool and a structure during quench is depicted in accordance with an illustrative embodiment. View 500 is a view of induction tool 300 and structure 334 during quench.

In view 500, conduit 502 of quenching system 504 provides quenching medium 506 to apertures 310 of contoured smart susceptor 306. Apertures 310 in contoured smart susceptor 306 allow quenching medium 506 to directly contact structure 334. In view 500, conduit 508 of quenching system 504 provides quenching medium 506 to apertures 312 of contoured smart susceptor 308. Apertures 312 in contoured smart susceptor 308 allow quenching medium 506 to directly contact structure 334. Locations of apertures 310 and apertures 312 can be selected to maximize cooling while minimizing mark-off.

Quenching is performed in a short period of time. In some illustrative examples, quenching reduces the temperature of structure 334 from room temperature to in under ten seconds.

As depicted, conduit 502 of quenching system 504 is disposed within air gap 328 with induction coil 326. As depicted, conduit 508 of quenching system 504 is disposed within air gap 332 with induction coil 330.

Quenching system 504 of induction tool 300 has any desirable quantity of conduits. Further, quenching system 504 provides any desirable type of quenching medium.

Figure 6:
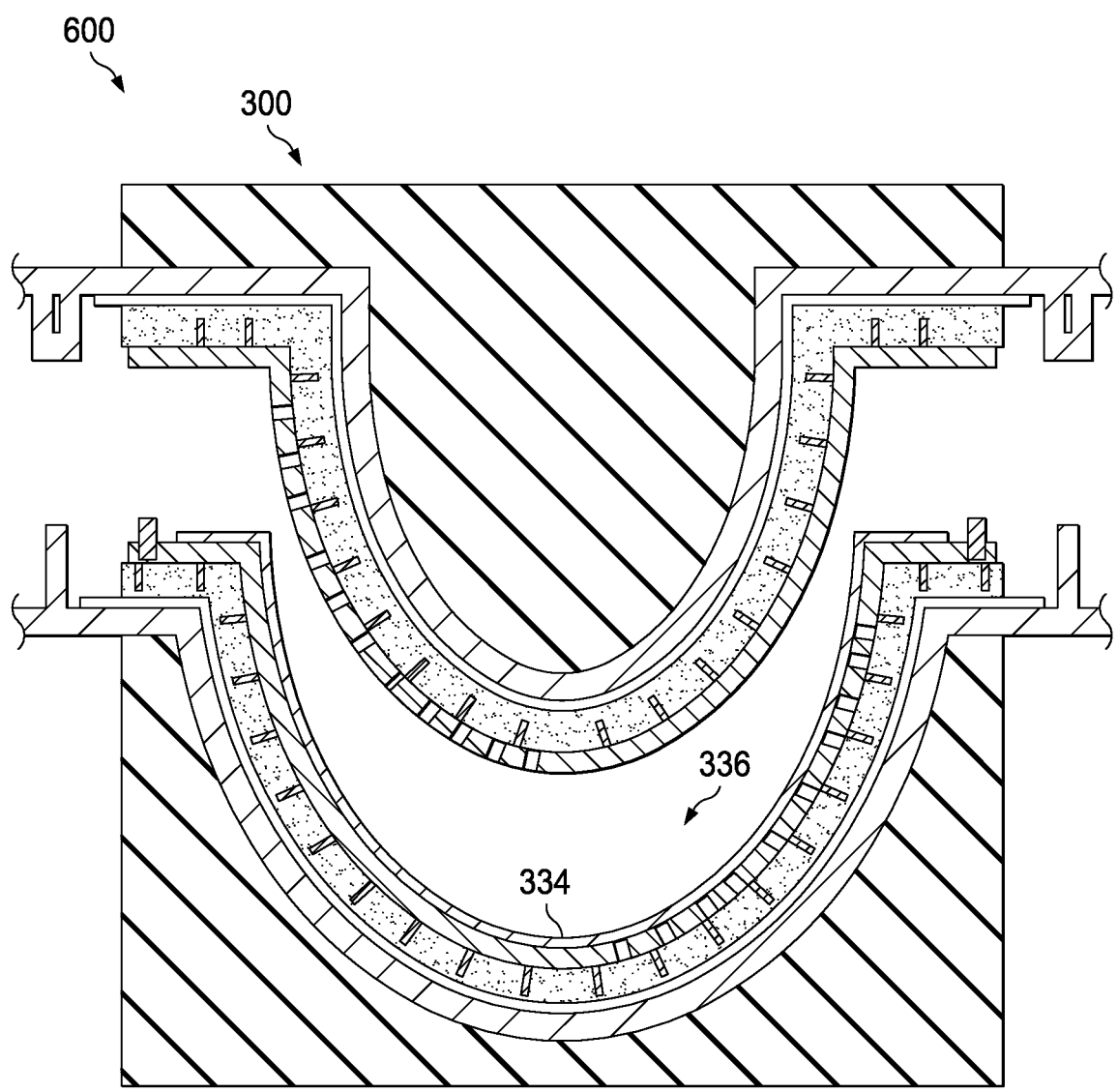
FIG. 6 is an illustration of a cross-sectional view of an induction tool and a heated and quenched structure in accordance with an illustrative embodiment.

Turning now to FIG. 6, an illustration of a cross-sectional view of an induction tool and a heat treated and quenched structure is depicted in accordance with an illustrative embodiment. View 600 is a view of induction tool 300 and structure 334 after heat treating and quenching of structure 334 in induction tool 300. In view 600, structure 334 has retained shape 336 despite having received heating and quenching.

Figure 7:
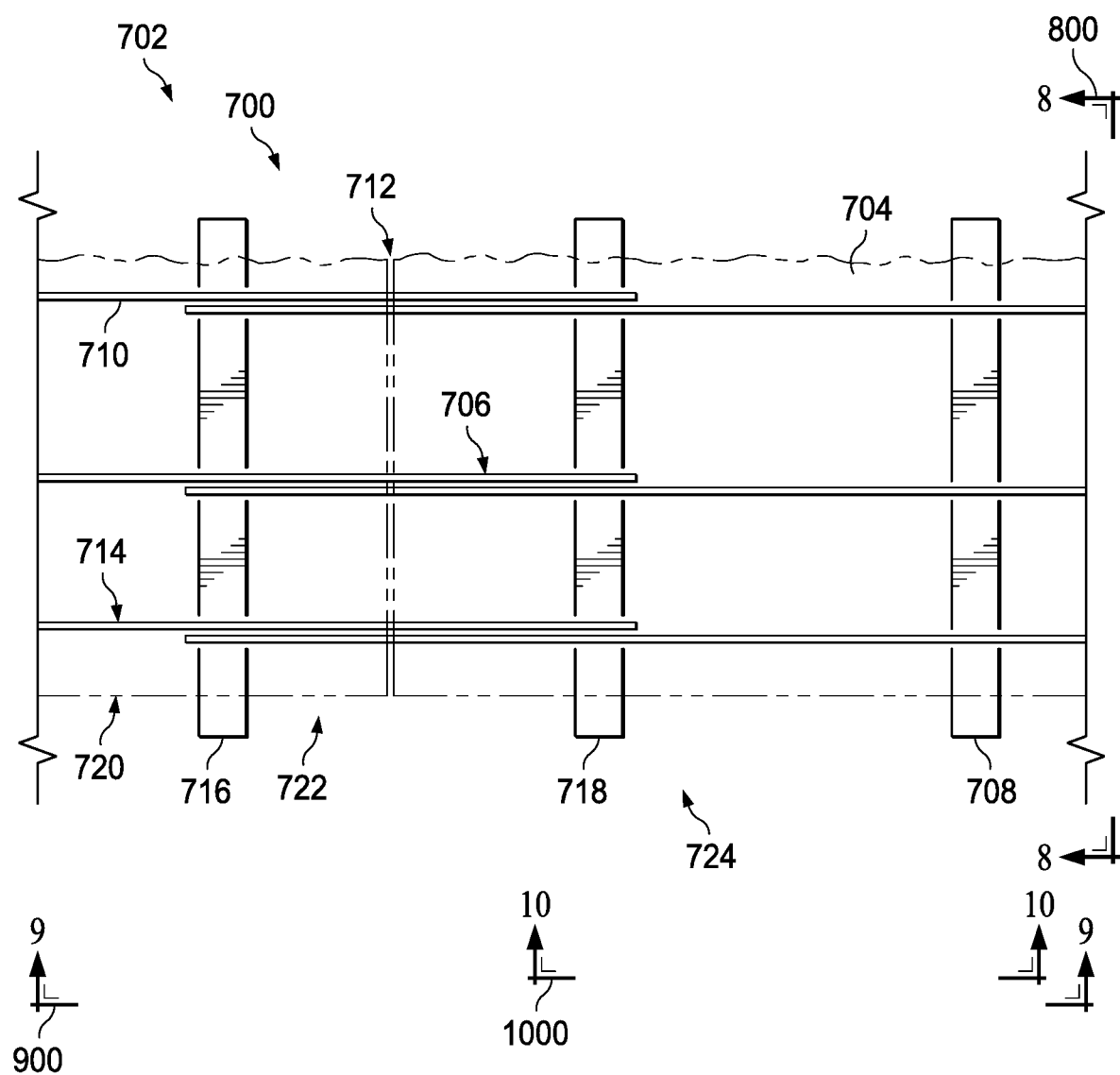
FIG. 7 is an illustration of a top view of a tooling die with a contoured smart susceptor in phantom in accordance with an illustrative embodiment.

Turning now to FIG. 7, an illustration of a top view of a tooling die with a contoured smart susceptor in phantom is depicted in accordance with an illustrative embodiment. Tooling die 700 is a physical implementation of one of first tooling die 110 or second tooling die 112 of FIG. 1. View 702 is a view looking onto contoured smart susceptor 704 of tooling die 700. In view 702, contoured smart susceptor 704 is in phantom to view plurality of bridging strips 706 and ceramic facing 708. Plurality of bridging strips 706 is within ceramic facing 708. Dielectric laminates (not depicted) are protected from heat of contoured smart susceptor 704 by ceramic facing 708. The dielectric laminates are obscured by ceramic facing 708 in view 702.

In view 702, induction coils and conduits are not depicted for ease of illustration and discussion purposes only. Any desirable quantity of induction coils and any desirable number of conduits may be present in view 702. For example, each of FIGS. 9 and 10 may be implementations of a side view of tooling die 700 having different quantities of induction coils and conduits.

Plurality of bridging strips 706 is positioned between the induction coils (not depicted) and contoured smart susceptor 704. Plurality of bridging strips 706 contacts contoured smart susceptor 704. Plurality of bridging strips 706 is formed of metallic laminates 710. As depicted, metallic laminates 710 support contoured smart susceptor 704. In view 702, metallic laminates 710 extend substantially perpendicular to ceramic facing 708. As depicted, plurality of bridging strips 706 run substantially perpendicular to the dielectric laminates. As depicted, plurality of bridging strips 706 is parallel to each other.

In this illustrative example, each bridging strip of plurality of bridging strips 706 crosses over multiple dielectric laminates. For example, bridging strip 714 crosses over a dielectric laminate obscured by ceramic portion 716 of ceramic facing 708 and a dielectric laminate obscured by ceramic portion 718 of ceramic facing 708. In this illustrative example, each bridging strip of plurality of bridging strips 706 extends over multiple air gaps. For example, bridging strip 714 crosses over air gap 720 and air gap 722 of air gaps 724.

As depicted, contoured smart susceptor 704 has expansion joint 712. Expansion joint 712 allows for contoured smart susceptor 704 to expand during heat-up. Expansion joint 712 absorbs thermal expansion of contoured smart susceptor 704. In some illustrative examples, expansion joint 712 is a circumferential discontinuity in contoured smart susceptor 704.

Figure 8:
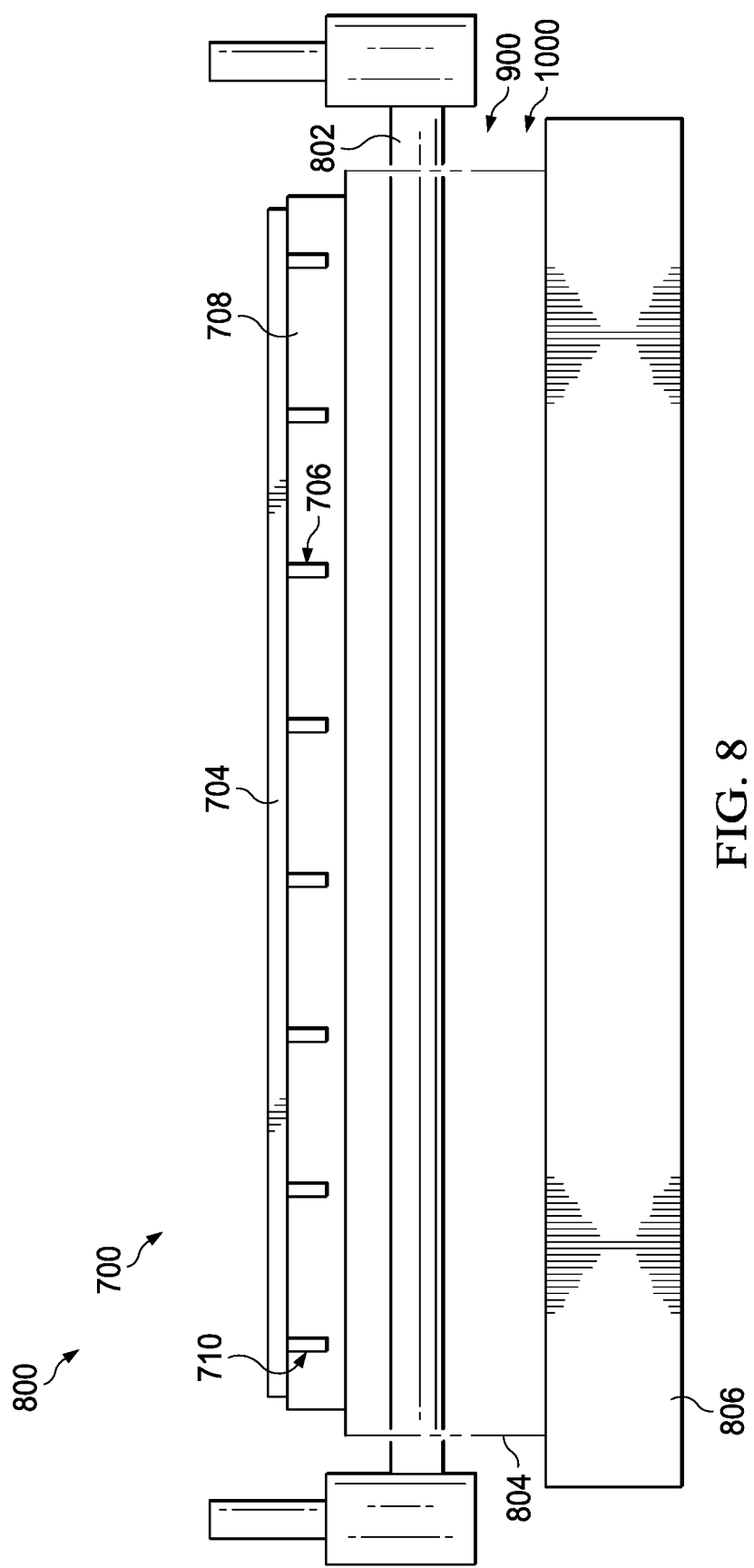
FIG. 8 is an illustration of a front view of a tooling die with dielectric laminate in phantom in accordance with an illustrative embodiment.

Turning now to FIG. 8, an illustration of a front view of a tooling die with dielectric laminate in phantom is depicted in accordance with an illustrative embodiment. View 800 is a front view of tooling die 700 of FIG. 7.

Induction coil 802 and dielectric laminate 804 are visible in view 800. As can be seen in view 800, plurality of bridging strips 706 is positioned between induction coil 802 and contoured smart susceptor 704. Plurality of bridging strips 706 contacts contoured smart susceptor 704. Plurality of bridging strips 706 do not contact dielectric laminate 804.

Also visible in view 800 is support 806. Support 806 may also be referred to as a base. When present, support 806 is formed of any desirable material. In some illustrative examples, support 806 is formed of a composite material. When present, support 806 of tooling die 700 provides a foundation for dielectric laminate 804 and other dielectric laminates (not depicted) of tooling die 700.

Figure 9:
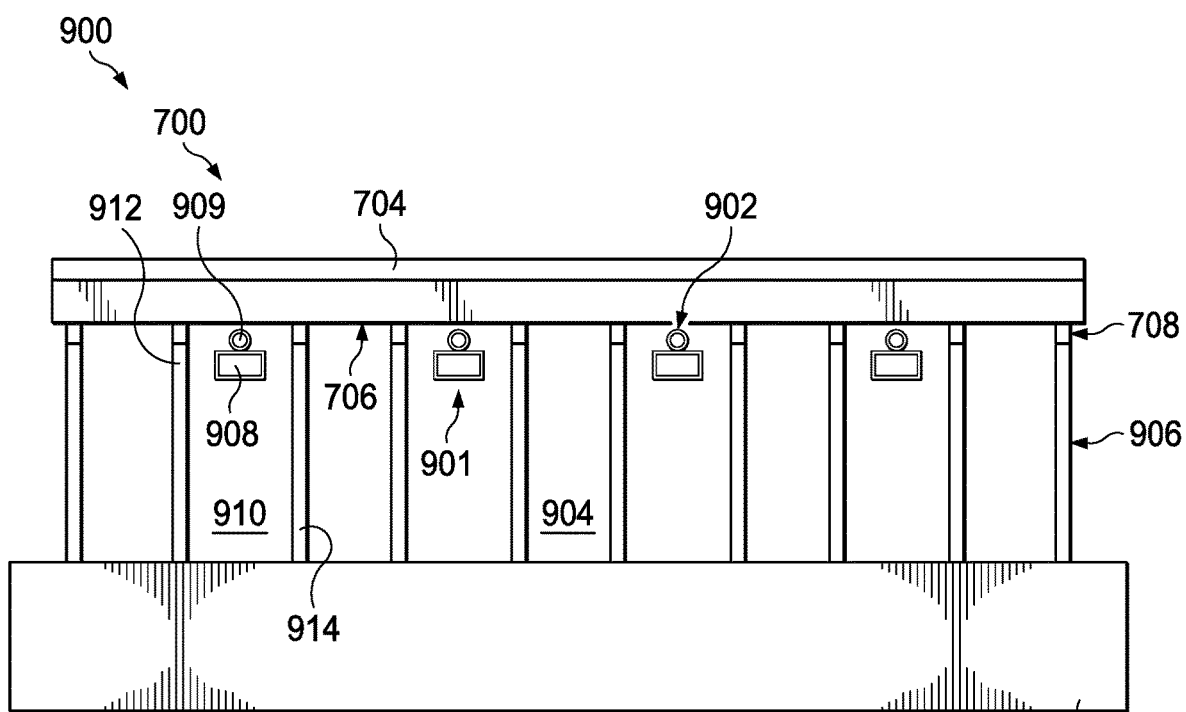
FIG. 9 is an illustration of a side view of a tooling die in accordance with an illustrative embodiment.

Turning now to FIG. 9, an illustration of a side view of a tooling die is depicted in accordance with an illustrative embodiment. In some illustrative examples, view 900 is a side view of tooling die 700 of FIG. 7.

Induction coils 901 and conduits 902 run through air gaps 904 formed by adjacent dielectric laminates of plurality of dielectric laminates 906. For example, induction coil 908 and conduit 909 run through air gap 910 of air gaps 904. Air gap 910 is formed by adjacent dielectric laminates, dielectric laminate 912 and dielectric laminate 914. As depicted, induction coils 901 are positioned in every other air gap of air gaps 904. As depicted, induction coils 901 and conduits 902 run through the same air gaps of air gaps 904. As depicted, only a single induction coil of induction coils 901 is positioned in a single air gap. For example, only induction coil 908 of induction coils 901 is present in air gap 910 of air gaps 904.

Although view 900 is described as a side view of tooling die 700, a side view of tooling die 700 may have alternative non-depicted embodiments. For examples, tooling die 700 may have any desirable quantity of induction coils 901. In some non-depicted examples, induction coils 901 may run through additional air gaps of air gaps 904. In some non-depicted examples, more than one induction coil extends through at least one air gap of air gaps 904.

Figure 10:
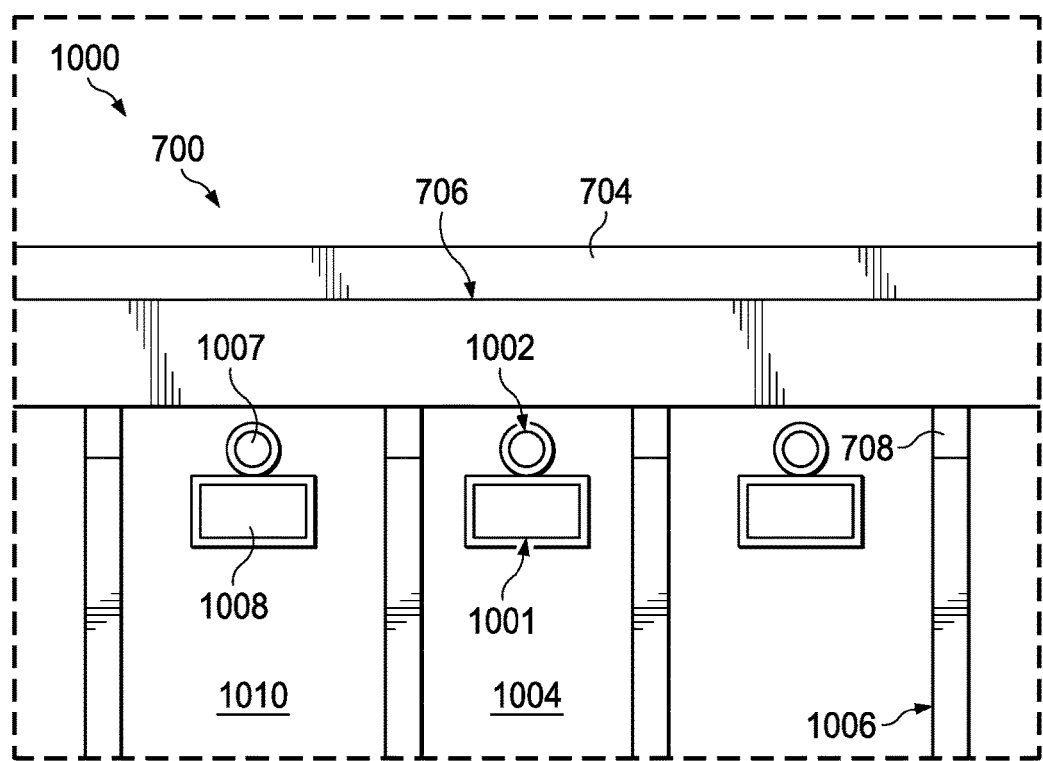
FIG. 10 is an illustration of a side view of an expansion joint of a contoured smart susceptor of a tooling die in accordance with an illustrative embodiment.

Turning now to FIG. 10, an illustration of a side view of an expansion joint of a contoured smart susceptor of a tooling die is depicted in accordance with an illustrative embodiment. In some illustrative examples, view 1000 is a side view of a portion of tooling die 700 of FIGS. 7 and 8. View 1000 may be an alternative arrangement to view 900 of FIG. 9.

Induction coils 1001 and conduits 1002 run through air gaps 1004 formed by adjacent dielectric laminates of plurality of dielectric laminates 1006. As depicted, induction coils 1001 are positioned in every air gap of air gaps 1004. As depicted, conduits 1002 are positioned in every air gap of air gaps 1004. As depicted, induction coils 1001 and conduits 1002 run through the same air gaps of air gaps 1004. For example, conduit 1007 and induction coil 1008 are present in air gap 1010. As depicted, only a single induction coil of induction coils 1001 is positioned in a single air gap. For example, only induction coil 1008 is positioned within air gap 1010.

Although view 1000 is described as a side view of tooling die 700, a side view of tooling die 700 may have alternative non-depicted embodiments. For examples, tooling die 700 may have any desirable quantity of induction coils 1001. In some non-depicted examples, induction coils 1001 and may run through additional air gaps of air gaps 1004. In some non-depicted examples, more than one induction coil extends through at least one air gap of air gaps 1004. In some non-depicted examples, the quantity of induction coils 1001 is different than the quantity of conduits 1002. In some non-depicted examples, some of air gaps 1004 may not include a conduit of conduits 1002. In some non-depicted examples, some of air gaps 1004 may not include an induction coil of induction coils 1001.

The different components shown in FIGS. 2-10 may be combined with components in FIG. 1, used with components in FIG. 1, or a combination of the two. Additionally, some of the components in FIGS. 2-10 may be illustrative examples of how components shown in block form in FIG. 1 can be implemented as physical structures.

Figure 11:
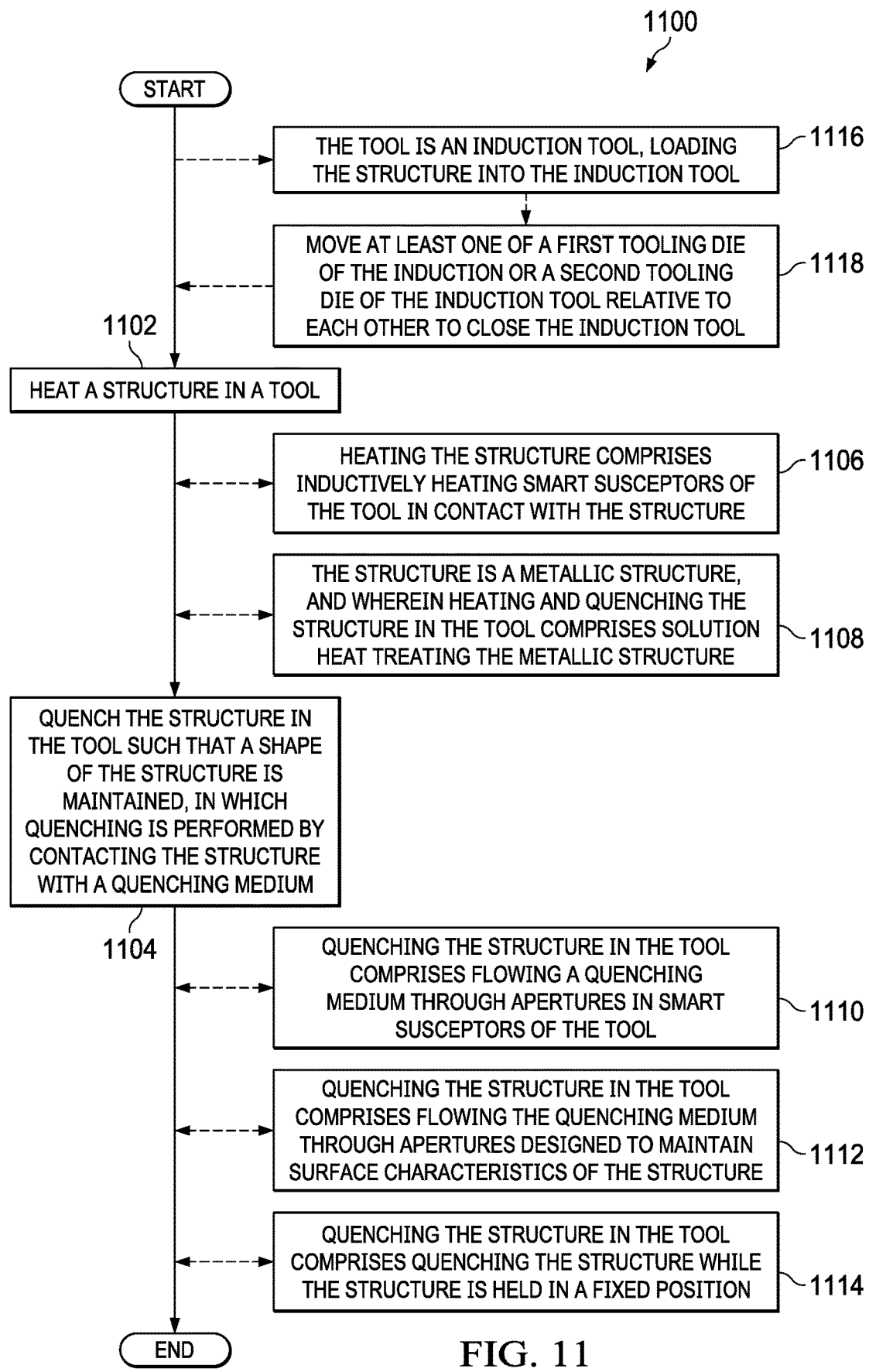
FIG. 11 is an illustration of a flowchart of a method for processing a structure in accordance with an illustrative embodiment.

Turning now to FIG. 11, an illustration of a flowchart of a method for processing a structure is depicted in accordance with an illustrative embodiment. Method 1100 may be implemented by tool 106 of FIG. 1. Method 1100 may be implemented using tooling die 200 of FIG. 2. Method 1100 may be performed in induction tool 300 of FIGS. 3-6. Method 1100 may be performed using tooling die 700 of FIGS. 7-10.

Method 1100 heats a structure in a tool (operation 1102). Method 1100 quenches the structure in the tool such that a shape of the structure is maintained, in which quenching is performed by contacting the structure with a quenching medium (operation 1104). Afterwards the method terminates.

In some illustrative examples, heating the structure comprises inductively heating smart susceptors of the tool in contact with the structure (operation 1106). In some illustrative examples, the structure is a metallic structure, and wherein heating and quenching the structure in the tool comprises solution heat treating the metallic structure (operation 1108).

In some illustrative examples, quenching the structure in the tool comprises flowing a quenching medium through apertures in smart susceptors of the tool (operation 1110). The quenching medium takes any desirable form. In some illustrative examples, the quenching medium is water. In some illustrative examples, quenching the structure in the tool comprises quenching the structure while the structure is held in a fixed position (operation 1114). In some illustrative examples, quenching the structure in the tool comprises flowing the quenching medium through apertures designed to maintain surface characteristics of the structure (operation 1112).

In some illustrative examples, when the tool is an induction tool, method 1100 loads the structure into the induction tool (operation 1116). In some illustrative examples, method 1100 moves at least one of a first tooling die of the induction or a second tooling die of the induction tool relative to each other to close the induction tool (operation 1118).

Figure 12:
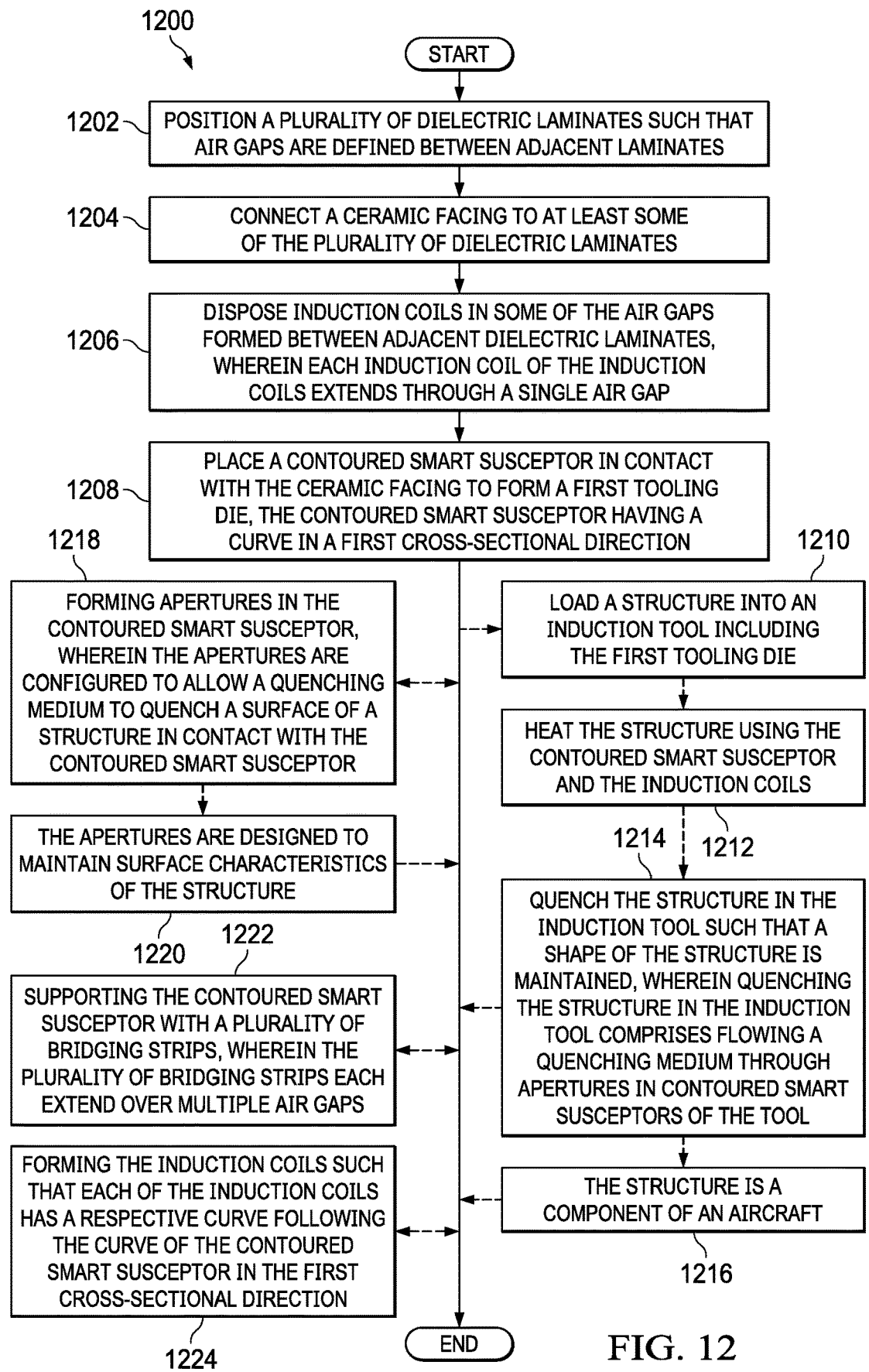
FIG. 12 is an illustration of a flowchart of a method for processing a structure in accordance with an illustrative embodiment.

Turning now to FIG. 12, an illustration of a flowchart of a method for processing a structure is depicted in accordance with an illustrative embodiment. Method 1200 may be implemented to form tool 106 of FIG. 1. Method 1200 may be implemented to form tooling die 200 of FIG. 2. Method 1200 may be performed to form induction tool 300 of FIGS. 3-6. Method 1200 may be performed to form tooling die 700 of FIGS. 7-10.

Method 1200 positions a plurality of dielectric laminates such that air gaps are defined between adjacent laminates (operation 1202). Method 1200 connects a ceramic facing to at least some of the plurality of dielectric laminates (operation 1204). Method 1200 disposes induction coils in some of the air gaps formed between adjacent dielectric laminates, wherein each induction coil of the induction coils extends through a single air gap (operation 1206). Method 1200 places a contoured smart susceptor in contact with the ceramic facing to form a first tooling die, the contoured smart susceptor having a curve in a first cross-sectional direction (operation 1208). Afterwards the method terminates.

In some illustrative examples, method 1200 loads a structure into an induction tool including the first tooling die (operation 1210). In some illustrative examples, method 1200 heats the structure using the contoured smart susceptor and the induction coils (operation 1212). In some illustrative examples, method 1200 quenches the structure in the induction tool such that a shape of the structure is maintained, wherein quenching the structure in the tool comprises flowing a quenching medium through apertures in smart susceptors of the tool (operation 1214). In some illustrative examples, the structure is a component of an aircraft (operation 1216).

In some illustrative examples, method 1200 forms apertures in the contoured smart susceptor, wherein the apertures are configured to allow a quenching medium to quench a surface of a structure in contact with the contoured smart susceptor (operation 1218). In some illustrative examples, the apertures are designed to maintain surface characteristics of the structure (operation 1220).

In some illustrative examples, method 1200 supports the contoured smart susceptor with a plurality of bridging strips, wherein the plurality of bridging strips each extend over multiple air gaps (operation 1222). In some illustrative examples, method 1200 forms the induction coils such that each of the induction coils has a respective curve following the curve of the contoured smart susceptor in the first cross-sectional direction (operation 1224).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 1100 or method 1200 are performed. For example, each of operations 1106-1118 in FIG. 11 may be optional operations of method 1100. As another example, each of operations 1210-1224 may be optional operations of method 1200.

Figure 13:
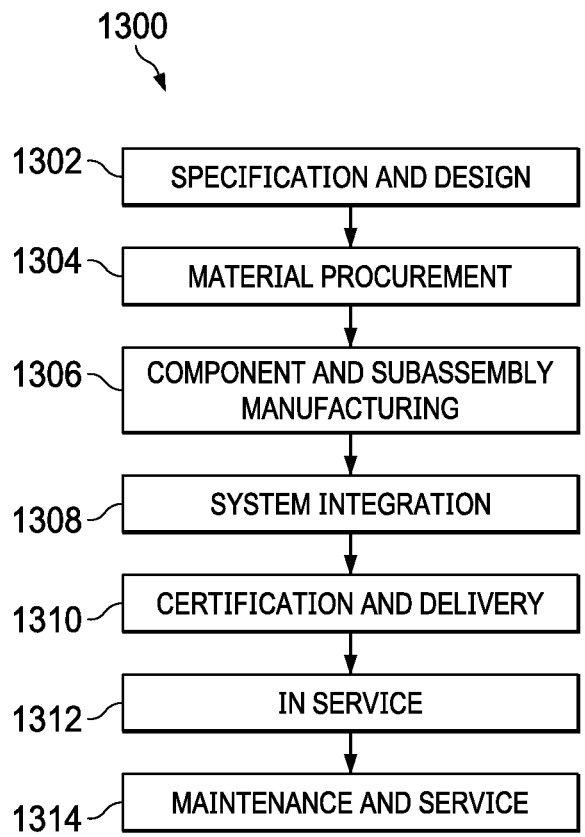
FIG. 13 is an illustration of an aircraft manufacturing and service method in the form of a block diagram in accordance with an illustrative embodiment.
Figure 14:
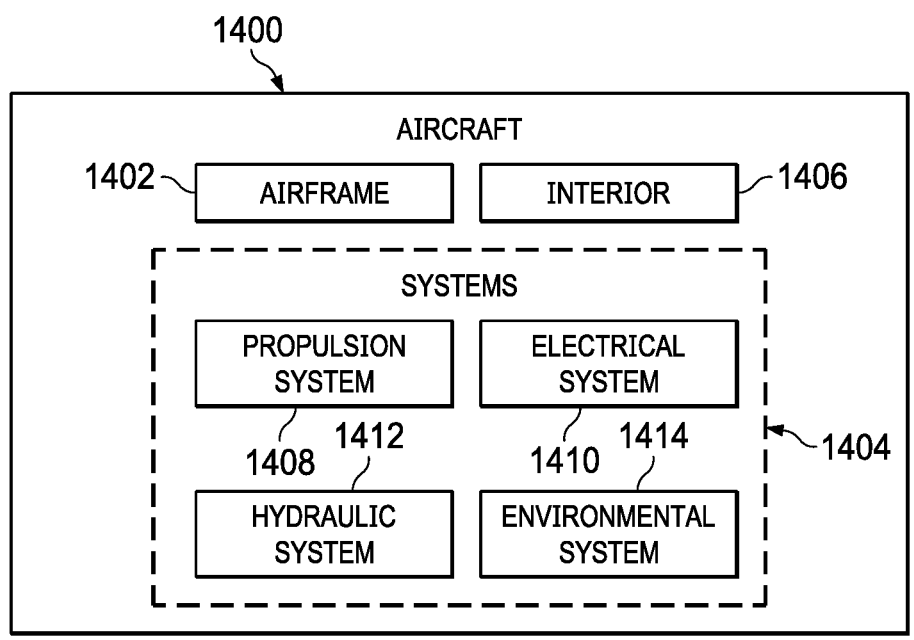
FIG. 14 is an illustration of an aircraft in the form of a block diagram in which an illustrative embodiment may be implemented.

Illustrative embodiments of the present disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During preproduction, aircraft manufacturing and service method 1300 may include specification and design 1302 of aircraft 1400 in FIG. 14 and material procurement 1304.

During production, component and subassembly manufacturing 1306 and system integration 1308 of aircraft 1400 takes place. Thereafter, aircraft 1400 may go through certification and delivery 1310 in order to be placed in service 1312. While in service 1312 by a customer, aircraft 1400 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers or major-system subcontractors; a third party may include, without limitation, any number of vendors, subcontractors, or suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with a plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300. One or more illustrative embodiments may be used during any of component and subassembly manufacturing 1306, system integration 1308, or maintenance and service 1314 of FIG. 13. For example, induction tool 108 of FIG. 1 may be used to heat treat and quench a structure during component and subassembly manufacturing 1306. As another example, induction tool 108 of FIG. 1 may be used to heat treat and quench replacement parts during maintenance and service 1314 of FIG. 13.

Apparatuses and methods embodied herein may be employed in manufacturing at least one component of aircraft 1400. For example, induction tool 108 of FIG. 1 may be used to manufacture a portion of at least one of airframe 1402 or interior 1406. For example, structure 100 may be a portion of airframe 1402 or interior 1406.

The illustrative examples enable an aluminum lip skin type structure to be solution treated and quenched with dimensional control of the part. The induction coils in the induction tool could run perpendicular to the lip bend to provide more even heating.

Quenching of the metallic structure is achieved through a quenching system which includes a quenching medium that quickly quenches the metallic part after heating. The illustrative examples use induction heat treatment with the laminated tooling where the metallic structure is held fixed in position while quenched.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An induction tool comprising:
a first tooling die comprising:
a plurality of dielectric laminates having air gaps defined between adjacent dielectric laminates;
a ceramic facing connected to at least some of the plurality of dielectric laminates;
a first contoured smart susceptor contacting the ceramic facing, the first contoured smart susceptor having a curve in a first cross-sectional direction; and
induction coils disposed in some of the air gaps formed between adjacent dielectric laminates, wherein each induction coil of the induction coils extends through a single air gap, such that each induction coil extends between two adjacent dielectric laminates of the plurality of dielectric laminates.

2. The induction tool of claim 1, wherein the induction coils run substantially parallel to the curve of the first contoured smart susceptor in the first cross-sectional direction.

3. The induction tool of claim 1 further comprising:
a quenching system having conduits extending along the induction coils.

4. The induction tool of claim 3, wherein the first contoured smart susceptor includes apertures to allow a quenching medium from the quenching system to quench a surface of a structure in contact with the first contoured smart susceptor.

5. The induction tool of claim 1, wherein the each of the plurality of dielectric laminates run substantially parallel to each other.

6. The induction tool of claim 1 further comprising:
a plurality of bridging strips within the ceramic facing.

7. The induction tool of claim 6, wherein the plurality of bridging strips is formed of metallic laminates.

8. The induction tool of claim 6, wherein the plurality of bridging strips run substantially perpendicular to the plurality of dielectric laminates.

9. The induction tool of claim 6, wherein the plurality of bridging strips each extend over multiple air gaps.

10. The induction tool of claim 6, wherein the plurality of bridging strips contacts the first contoured smart susceptor.

11. The induction tool of claim 6, wherein the plurality of bridging strips is parallel to each other.

12. The induction tool of claim 6, wherein the plurality of bridging strips is positioned between the induction coils and the first contoured smart susceptor.

13. The induction tool of claim 1, wherein the plurality of dielectric laminates is arranged in a fan shape relative to a centerline of the tooling die.

14. The induction tool of claim 1, wherein the first contoured smart susceptor has an expansion joint.

15. The induction tool of claim 1, wherein the curve in the first cross-sectional direction of the first contoured smart susceptor is configured to restrain a structure during heating and quenching to produce a component of an aircraft.

16. The induction tool of claim 1, wherein each of the induction coils has a respective curve following the curve of the first contoured smart susceptor in the first cross-sectional direction.

17. The induction tool of claim 16, wherein the respective curve of each of the induction coils is perpendicular to a lip of a structure heated and quenched using the tooling die.

18. The induction tool of claim 1 further comprising:
a second tooling die, wherein the first tooling die and the second tooling die are movable relative to each other, wherein the second tooling die has a respective contoured smart susceptor having apertures.

19. The induction tool of claim 18 further comprising:
a quenching system in communication with the apertures of each respective contoured smart susceptor.

20. The induction tool of claim 18 further comprising:
induction coils disposed between a second plurality of dielectric laminates of the second tooling die.

21. The induction tool of claim 18, wherein each respective contoured smart susceptor has an expansion joint.

22. The induction tool of claim 18, wherein the first tooling die and the second tooling die are configured to restrain a structure during heating and quenching of the structure using the induction tool, wherein the structure is a component of an aircraft.

23. An induction tool comprising:
a first tooling die comprising:
a first plurality of dielectric laminates having air gaps defined between adjacent dielectric laminates;
a first ceramic facing connected to at least some of the first plurality of dielectric laminates;
a first contoured smart susceptor contacting the first ceramic facing, the first contoured smart susceptor having a curve in a first cross-sectional direction; and
a first plurality of induction coils disposed in some of the air gaps formed between adjacent dielectric laminates, wherein each induction coil of the first plurality of induction coils extends through a single air gap, such that each induction coil of the first plurality of induction coils extends between two adjacent dielectric laminates of the first plurality of dielectric laminates; and
a second tooling die comprising:
a second plurality of dielectric laminates having air gaps defined between adjacent dielectric laminates;
a second ceramic facing connected to at least some of the second plurality of dielectric laminates;
a second contoured smart susceptor contacting the second ceramic facing, the second contoured smart susceptor having a curve in the first cross-sectional direction; and
a second plurality of induction coils disposed in some of the air gaps formed between adjacent dielectric laminates of the second plurality of dielectric laminates, wherein each induction coil of the second plurality of induction coils extends through a single air gap, such that each induction coil of the second plurality of induction coils extends between two adjacent dielectric laminates of the second plurality of dielectric laminates.

24. The induction tool of claim 23 further comprising:
a quenching system in communication with apertures of each respective contoured smart susceptor.

25. The induction tool of claim 23, wherein each respective contoured smart susceptor has an expansion joint.

26. The induction tool of claim 23, wherein the first tooling die and the second tooling die are configured to restrain a structure during heating and quenching of the structure using the induction tool, wherein the structure is a component of an aircraft.

27. The induction tool of claim 23, wherein the curve in the first cross-sectional direction of the first contoured smart susceptor is configured to restrain a structure during heating and quenching to produce a component of an aircraft.

28. The induction tool of claim 23, wherein the first plurality of induction coils run substantially parallel to the curve of the first contoured smart susceptor in the first cross-sectional direction.

29. The induction tool of claim 23, wherein the first plurality of dielectric laminates is arranged in a fan shape relative to a centerline of the first tooling die, and wherein the second plurality of dielectric laminates is arranged in a fan shape relative to a centerline of the second tooling die.

30. The induction tool of claim 23 further comprising:
a first plurality of bridging strips within the first ceramic facing; and
a second plurality of bridging strips within the second ceramic facing.

31. The induction tool of claim 30, wherein the first plurality of bridging strips and the second plurality of bridging strips are formed of metallic laminates.

32. The induction tool of claim 30, wherein the first plurality of bridging strips run substantially perpendicular to the first plurality of dielectric laminates.

33. The induction tool of claim 30, wherein the first plurality of bridging strips each extend over multiple air gaps and the second plurality of bridging strips each extend over multiple air gaps.

34. The induction tool of claim 30, wherein the first plurality of bridging strips contacts the first contoured smart susceptor.

35. The induction tool of claim 30, wherein the first plurality of bridging strips is parallel to each other, and wherein the second plurality of bridging strips is parallel to each other.

36. The induction tool of claim 30, wherein the first plurality of bridging strips is positioned between the first plurality of induction coils and the first contoured smart susceptor, and wherein the second plurality of bridging strips is positioned between the second plurality of induction coils and the second contoured smart susceptor.

37. An induction tool comprising:
a first tooling die comprising:
a plurality of dielectric laminates having air gaps defined between adjacent dielectric laminates;
a ceramic facing connected to at least some of the plurality of dielectric laminates;
a first contoured smart susceptor contacting the ceramic facing, the first contoured smart susceptor having apertures to allow a quenching medium from a quenching system to exit the apertures and quench a surface of a structure in contact with the first contoured smart susceptor, and the first contoured smart susceptor having a curve in a first cross-sectional direction; and
induction coils disposed in some of the air gaps formed between adjacent dielectric laminates, wherein each induction coil of the induction coils extends through a single air gap such that each induction coil extends between two adjacent dielectric laminates.

38. An induction tool comprising:
a first tooling die comprising:
a plurality of dielectric laminates having air gaps defined between adjacent dielectric laminates such that each air gap of the air gaps is formed by two adjacent dielectric laminates of the plurality of dielectric laminates;
a ceramic facing connected to at least some of the plurality of dielectric laminates;
a first contoured smart susceptor contacting the ceramic facing, the first contoured smart susceptor having a curve in a first cross-sectional direction;
induction coils disposed in some of the air gaps formed between adjacent dielectric laminates, wherein each induction coil of the induction coils extends through a single air gap such that each induction coil extends between two adjacent dielectric laminates forming the single air gap; and
a plurality of bridging strips positioned between the induction coils and the first contoured smart susceptor, wherein the plurality of bridging strips is configured to provide support to the first contoured smart susceptor, and wherein the plurality of bridging strips do not contact the first plurality of dielectric laminates.

* * * * *